Oct. 12, 1937.                   E. TVETER                   2,095,425
FISH LURE
Filed March 4, 1935
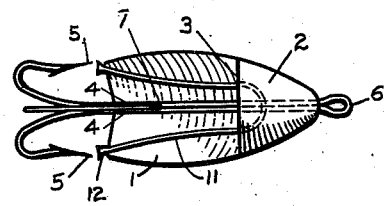
Fig. 1
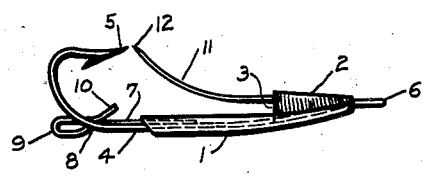
Fig. 2
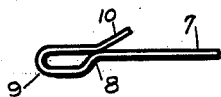
Fig. 3
Fig. 6
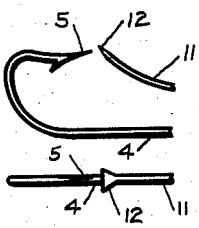
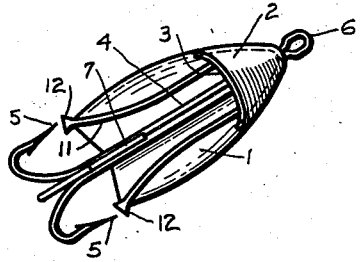
Fig. 5
Fig. 4
INVENTOR
E. Tveter
BY H.J. Sanders
ATTORNEY Patented Oct. 12, 1937

2,095,425

UNITED STATES PATENT OFFICE 2,095,425

FISH LURE

Einar Tveter, Chicago, Ill.

Application March 4, 1935, Serial No. 9,277

1 Claim. (Cl. 43—39)

This invention relates to improvements in fish lure or artificial bait for fish. One object is to provide a fish lure having a body portion of concavo-convex formation tapering at one end and there formed or provided with a pocket that may carry a weight when the lure is to be used in deep water fishing so that the lure will travel well below the surface of the water, or which pocket may be weightless for shallow water fishing. A further object is to provide a lure that when towed through the water will have a lateral oscillating movement in a horizontal plane but that will under no conditions rotate or spin.

A further object is to provide a fish lure of the spoon type wherein the body portion of the lure is preferably formed integral with hooks in multiple, although a single hook may be employed if desired. A further object is to provide a fish lure wherein the hook shank or shanks may extend longitudinally of and beyond the body and shell or weight portion, or said shank or shanks may terminate within the shell or weight portion, or at a point spaced therefrom.

A further object is to provide a fish lure provided preferably with multiple hooks and with a bait-carrier disposed between the hook shanks and below the points of the hooks so that the bait may not foul both hook points at the same time, the bait carrier being secured to the hook shanks direct.

A further object is to provide a bait-carrier formed of resilient material and having one looped end, the mouth portion thereof being yieldingly retained closed so that the bait may be manually applied thereto or removed therefrom but may not become accidentally detached therefrom. A further object is to provide a fish lure wherein the hook points lie in a horizontal plane.

With the foregoing and other objects in view the invention consists in the combination and arrangement of parts to be hereinafter fully described, pointed out in the claim and illustrated in the accompanying drawing which forms a part of this application for patent and in which—

Fig. 1 is a top plan view of an embodiment of the present invention.

Fig. 2 is a view of Fig. 1 in side elevation.

Fig. 3 is a side view of one end of the bait-carrier.

Fig. 4 is a detail plan view of a weed guard and hook.

Fig. 5 is a view of the fish lure in perspective.

Fig. 6 is a view of Fig. 4 in elevation.

Like reference characters denote corresponding parts throughout the several views.

The lure or artificial bait forming the subject matter of this application includes a body portion 1 of the spoon type at the forward end of which the pocket 2 is formed that may be empty or that may be wholly or partly filled with ballast or a weight 3 of lead or like material. Integral with or secured to the body 1 are the shanks 4 that terminate in the hooks 5, said shanks either extending longitudinally of the body portion and pocket and beyond said members and terminating in an eye 6, or terminating within the pocket or in spaced relation thereto, said hooks 5 being spaced well apart from each other and their points lying in a common horizontal plane. In the event that the hook shanks do not extend through and beyond the body and pocket a separate eye 6 is secured to the smaller or forward end of the pocket.

Secured to the shanks 4 of the hooks and preferably disposed thereupon is the shank 7 of the bait-carrier, said shank at its rear end being formed with the offset 8 and then bent to form the loop 9, the mouth of said loop being formed by the juncture of said offset and the upturned termination 10 of the carrier, said carrier portions 8 and 10 being yieldingly retained in contact with each other so that to apply the bait to the loop said members are manually spread apart and the pork rind or like bait is impaled upon said end 10 and forced past said point of juncture to be carried by the loop 9. The yieldingly closed mouth of the loop prevents the accidental disengagement of the bait from the carrier. The bait-carrier is of such length that its loop 9 is disposed below and not to the rear of the hook or hooks 5 so that a fish may not seize the bait without also seizing the hook or hooks.

Secured to the body portion 1, preferably within the pocket, is the base of the elongated U-shaped weed guard 11, the sides of the same rising upwardly from said body portion and diverging somewhat at their ends which ends 12 are flattened and terminate contiguous to the pointed ends of the hooks 5. With the bait applied to the carrier and the line secured to the eye 6 the lure is drawn through the water in the conventional manner. The guard 11 is formed of a piece of resilient material sufficiently stiff to provide weed protection to the hooks. While the foregoing is the preferred embodiment of the invention it is to be understood that it is capable of modifications and refinements all within the scope of the appended claim.

What is claimed is:—

In a fish lure, a body portion, a pocket at one end thereof, a weight within said pocket, hooks carried by said body portion, the ends thereof being disposed in a common horizontal plane, an U-shaped guard of resilient material having its base secured to said body portion and its sides extending upwardly therefrom and diverging from each other and terminating in flattened ends disposed contiguous to said hook ends, and a bait-carrier carried by said body portion and disposed between said hooks and below the same.

EINAR TVETER.